United States Patent
Nikonov et al.

(10) Patent No.: US 6,566,679 B2
(45) Date of Patent: May 20, 2003

(54) INTEGRATED SEMICONDUCTOR SUPERLATTICE OPTICAL MODULATOR

(75) Inventors: Dmitri E. Nikonov, Santa Clara, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/246,967

(22) Filed: Sep. 18, 2002

(65) Prior Publication Data

US 2003/0020075 A1 Jan. 30, 2003

Related U.S. Application Data

(62) Division of application No. 09/435,057, filed on Oct. 25, 1999, now Pat. No. 6,501,092.

(51) Int. Cl.[7] .......................... H01L 29/78; H01L 33/00
(52) U.S. Cl. ........................... 257/29; 24/184
(58) Field of Search .......................... 257/29, 24, 184

(56) References Cited

U.S. PATENT DOCUMENTS

| | | | |
|---|---|---|---|
| 4,422,088 A | 12/1983 | Gfeller | |
| 4,695,120 A | 9/1987 | Holder | |
| 4,758,092 A | 7/1988 | Heinrich et al. | |
| 4,761,620 A | 8/1988 | Bar-Joseph et al. | |
| 4,865,427 A | 9/1989 | Kingston et al. | |
| 4,871,224 A | 10/1989 | Karstensen et al. | |
| 4,917,450 A | 4/1990 | Pocholle et al. | |
| 4,966,430 A | 10/1990 | Weidel | |
| 5,055,887 A | 10/1991 | Yamazaki | |
| 5,061,027 A | 10/1991 | Richard | |
| 5,132,750 A | * | 7/1992 | Kato et al. |
| 5,153,770 A | 10/1992 | Harris | |
| 5,159,700 A | 10/1992 | Reid et al. | |
| 5,198,684 A | 3/1993 | Sudo | |
| 5,400,419 A | 3/1995 | Heinen | |
| 5,432,630 A | 7/1995 | Lebby et al. | |
| 5,434,434 A | 7/1995 | Kasahara et al. | |
| 5,485,021 A | 1/1996 | Abe | |
| 5,502,779 A | 3/1996 | Magel | |
| 5,568,574 A | 10/1996 | Tanguay, Jr. et al. | |
| 5,605,856 A | 2/1997 | Goosen et al. | |
| 5,617,446 A | * | 4/1997 | Ishibashi et al. |
| 5,625,636 A | 4/1997 | Bryan et al. | |
| 5,629,838 A | 5/1997 | Knight | |
| 5,638,469 A | 6/1997 | Feldman et al. | |
| 5,696,862 A | 12/1997 | Hauer et al. | |
| 5,835,646 A | 11/1998 | Yoshimura et al. | |
| 5,864,642 A | 1/1999 | Chun et al. | |
| 5,872,360 A | 2/1999 | Paniccia et al. | |
| 6,060,723 A | 5/2000 | Nakazato et al. | |
| 6,154,475 A | * | 11/2000 | Soref et al. |
| 6,211,531 B1 | 4/2001 | Nakazato et al. | |

OTHER PUBLICATIONS

Miller, DAB: "Reason and Prospects for Dense Optical Interconnections", Presentation by Standfor University Professor, Oct. 1997.

(List continued on next page.)

Primary Examiner—Stephen D. Meier
(74) Attorney, Agent, or Firm—Blakely, Sokoloff, Taylor & Zafman LLP

(57) ABSTRACT

Devices and techniques for integrating a silicon superlattice optical modulator on a silicon substrate with other circuit elements. The superlattice structure is designed to convert the indirect bandgap structure of silicon into a direct bandgap structure to achieve more efficient optical absorption. The modulator can be fabricated based on a structure of a circuit element by using standard fabrication processes for silicon integrated circuits such as metal oxide semiconductor processing.

9 Claims, 2 Drawing Sheets-

OTHER PUBLICATIONS

Sakano, S. et al.: "InGaAsP/InP Monolithic Integrated Circuit with Lasers and an Optical Switch", Electronics Letters, 22(11), May 1986.

Mansuripur, M., Goodman, JW: "Signal and Noise in Magneto–Optical Readout", J. Appl. Phys., 53(6), Jun. 1982.

"Optoelectronic VLSI Foundry Services from Lucent Technologies", Lucent Technologies Bell Labs Innovations Web page at http://www.bell–labs.com/project/oevlsi/, updated Mar. 2, 1997.

"Process for Fabricating OE/VLSI Chips", Lucent Technologies Bell Labs Innovations Web Page at http://www-.bell–labs.com/project/oevlsi/wfabproc.html, updated Sep. 26, 1996.

"Detailed Design Rules for Workshop Chips", Lucent Technologies Bell Labs Innovations Web Page at http://www-.bell–labs.com/project/oevlsi/wdesrule.html, updated Mar. 7, 1997.

Cutolo, A. et al.: "Sillicon Electro–Opitc Modulator Based on a Three Terminal Device Integrated in a Low–Loss Single–Mode SOI Waveguide", in J. of Lightwave Technology, vol. 15(3), Mar. 1997.

Raybon, G. et al.: "A Reconfigurable Optoelectronic Wavelength Converter Based on an Integrated Electoabsorption Modulated Laser Array", in 1997 Digest of the IEEE/LEOS Summer Topical Meetings, Montreal, Quebec, Canada, Aug. 1997.

Reiley, DJ, Sasian JM: "Optical Design of a Free–Space Photonic Switching System", in Applied Optics, vol. 36(19), Jul. g1997.

Heinrich, HK: "A Noninvasive Optical Probe for Detecting Electrical Signals in Silicon Integrated Circuits", Doctoral Dissertation, Stanford University, Apr., 1987.

Orobtchouk, R. et al.: "Quasi–Teoo Singlemode Optical Waveguides for Electro–optical Modulation at 1.3μm Using Standard SIMOX Material", in IEEE Proc. Optoelectron, vol. 144(2), Apr. 1997.

Soref, RA: "Electrooptical Effects of Silicon" in IEEE J of Quantum Electron, vol. QE–23(1), Jan. 1997.

Heinrich, HK: "A Noninvasive Optical Probe for Detecting Electrical Signals in Silicon Integrated Circuits", Doctoral Dissertation, Stanford University, Apr. 1987.

Orobtchouk, R. et al.: "Quasi–Teoo Singlemode Optical Waveguides for Electro–optical Odulation at 1.3μm Using Standard SIMOX Material" in IEEE Proc. Optoelectron, vol. 144 (2), Apr. 1997.

Soref, RA: "Electrooptical Effects of Silicon" in IEEE J of Quantum Electron, vol. QE–23 (1), Jan. 1997.

Cutolo, A. et al.: "An Electrically Controlled Bragg Reflector Integrated in a Rib Silicon on Insulator Waveguide", in Appl. Pys. Sett., vol. 71 (2), Jul. 1997.

Silva, MTC, Herczfeld PR: "Optical Intesity Modulator Based on Electrically Induced Periodic Structure", Optoelectronics and Systems Research Laboratory, Sao Paulo & Center for Microwave and Lightwave Engineering, Drexel University, Philadelphia, PA.

Kuwamura, Y. et al: "Analysis of Operating Mechanism in Semiconductor Optical Molulator with Electon–Depleting Absorption Control", in Electronics and Communications in Japan, vol. 79, (5), Dec. 1995.

Liu, MY, Chou, SY: "High–Modulation–Depth and Short-–Cavity–Length Silicon Fabry–Perot Modulator with Two Grating Bragg Reflectors" in Appl. Phys. Lett., vol. 68 (2), Jan. 1996.

Koren, U. et al.: "A Polarization Insensitive Semiconductor Optical Amplifier with Integrated Electroabsorption Modulators", in Integrated Photonics Research, Apr. 29–May 2, 1996 Technical Digest Series, vol. 6, 1996.

Krishnamoorthy, AV, Miller, DABM: "Free–Space Optical Interconnections for VLSI Systems: A Technology Roadmap", Conference Proceedings Leos '96 $9^{th}$ Annual Meeting U IEEE Lasers and Electro–Optics (vol. 1), Nov. 1996.

Goosen, KW: "GaAs MQW Modulators Integrated with Silicon CMOS", in IEEE Photonics Technology Letters, vol. 7 (4), Apr. 1995.

Wang, C. et al: "Ultrafast, All–Silicon Light Modulator", Optics Letter, 19 (18), Sep. 1994.

Tada K., Okada, Y.: "Bipolar Transistor Carrier–Injected Optical Modulator/Switch: Proposal and Analysis", IEEE Electr. Dev. Ltrs., 7 (11), 1986.

Fernando, C. et al.: "Si/$Si_{0.85}$/$GE_{0.15}$/Si P–I–N Waveguide Optical Intensity Modulator", SPIE, vol. 2402 (31), 1995.

Alping, A. et al.: "Highly Efficient Waveguide Phase Modulator for Integrated Optoelectronics", Appl. Phys. Letter, 48 (19), May 1986.

Levitan, SP et al.: "Computer–Aided Design of Free–Space Opto–Electonic Systems", DAC 97, Anaheim, California, 1997.

Goodman, JW et al.: "Optical Interconnections for VLSI Systems", Proc. IEEE, 72 (7), Jul. 1984.

* cited by examiner

INTEGRATED SEMICONDUCTOR SUPERLATTICE OPTICAL MODULATOR

CROSS-REFERENCE TO RELATED APPLICATIONS

This application is a divisional of U.S. patent application Ser. No. 09/435,057 filed Oct. 25, 1999 now U.S. Pat. No. 6,501,092.

BACKGROUND OF THE INVENTION

1. Field of the Invention

The present disclosure generally relates to semiconductor devices, and more particularly, to semiconductor optical modulators.

2. Background Information

Optical waves have carrier frequencies on the order of $10^{14}$ Hz and hence can be modulated at frequencies higher than radio-frequency waves and microwaves. Such high-frequency modulation allows an optical wave to have a high bandwidth for transmitting information such as an optic fiber link in a communication system. Optical transmission also offers immunity to electromagnetic interference, cross talk and other adverse effects suffered by electrical transmission. Further, information carried by an optical wave may be processed optically to achieve a high processing speed and parallel processing in certain applications, such as imaging through a lens system. Moreover, optical materials may be used for high-density data storage such as holographic memories. Therefore, data transmission and processing through optical waves can provide significant advantages in various aspects over their electronic counterparts.

However, current optical systems and devices have limitations. This is in part because many optical technologies are still in their infancy and in part because the inherent characteristics of the optical waves and respective devices restrict their use in many applications. As a result, there has been an effort in integrating certain optical systems and devices with electronic systems and devices to form hybrid optoelectronic systems and devices so as to take the advantages of both optical and electronic sides and to avoid their respective shortcomings. For example, electronic processors may be used to process the information in the electrical domain. The electronic data is then converted into optical signals for transmission over a high-speed optical link.

One important area for many hybrid optoelectronic systems or devices is in electronic-to-optical interfacing devices that convert electronic signals into optical signals. This conversion can be achieved by using electrically controlled optical modulators to modulate at least one parameter of an optical wave, such as the amplitude, phase, frequency, or a combination of these parameters.

Optical signal switches may also be based on optical modulators. Since many electronic circuits are integrated on silicon wafers, it is often desirable to use photosensitive semiconductors to construct the optical modulators in compact form and integrate them onto silicon wafers.

Many highly photosensitive semiconductor materials are compounds made from III–V elements, such as GaAs and InP. It can be technically difficult to grow these materials on a silicon wafer due to their lattice mismatch. One way to integrate discrete components of different semiconductor materials uses an interconnect such as an indium bump. Such integration can be limited in several aspects. It adds extra size. It can also have an increased parasitic effect.

SUMMARY OF THE INVENTION

An apparatus and method for a radiation beam modulator are disclosed. In one embodiment, a disclosed semiconductor device includes a substrate of a semiconductor material configured to have an integrated circuit element that defines a first area and a second area that are at different electrical potentials. A superlattice structure is formed in the integrated circuit element relative to the first and second areas to have alternating layers formed of the semiconductor material and insulator layers formed of another material. The semiconductor layers and insulator layers are configured to cause direct bandgap absorption of radiation energy in the semiconductor layers to modulate a radiation beam that passes through the superlattice structure in response to a potential difference between the first and second areas. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1:
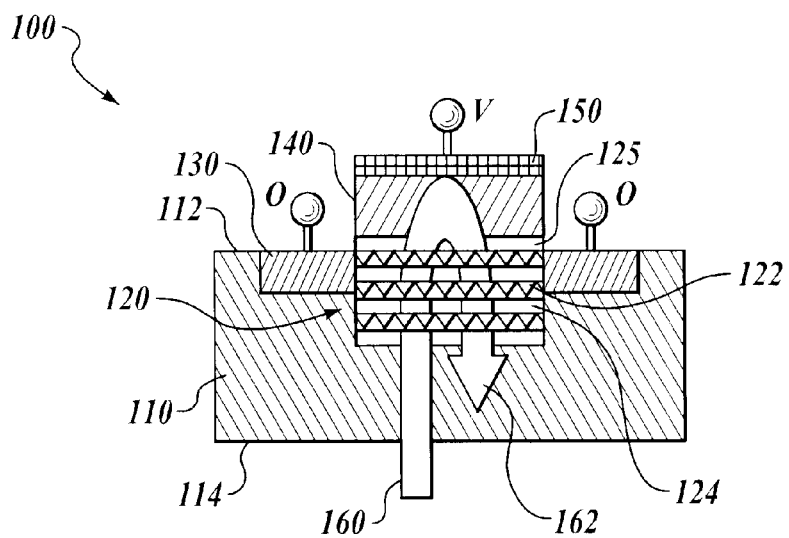
FIG. 1 illustrates one embodiment of a silicon superlattice optical modulator formed in a MOSFET structure on a silicon substrate, where the layers of the superlattice in the substrate stack in a vertical direction. Light propagates vertically that is perpendicular to the substrate surfaces.

A method and an apparatus providing an optical or radiation modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present disclosure provides a semiconductor device that has an optical modulator formed of a semiconductor superlattice integrated on a substrate of a semiconductor material. An integrated circuit element is formed on the substrate to define a first area and a second area that are at different electrical potentials. The superlattice structure is formed in or proximate to the integrated circuit element between said first and second areas to have alternating semiconductor and insulator layers. The charge layers are formed in the semiconductor layers of the superlattice due to the difference of potentials. The insulator layers are formed of a material different from that of the substrate. The semiconductor layers and insulator layers are configured to cause a change in the band structure of the semiconductor such that an indirect-bandgap material (such as bulk silicon) turns into a direct-bandgap material. Interaction of light with electrons in the states across the direct bandgap provides a stronger modulation of a radiation beam in response to a potential difference between the first and second areas. In one embodiment, the integrated circuit element may be a transistor that is commonly used in integrated circuits. Any of the four terminals of the transistor (e.g. the gate, the source, the drain and the substrate) may be used as the first and second areas to provide the potential difference across the superlattice.

One embodiment of the devices and techniques presented below are in part based on the recognition that it is desirable to use silicon as the photo-sensitive material to modulate an optical wave in order to avoid the difficulty of integrating an optical modulator based on a non-silicon semiconductor onto a silicon wafer. Silicon is photosensitive and can be used to modulate light. However, silicon has an indirect bandgap structure. The probability of absorbing photons to excite electrons from the valence band to the conduction band is lower when compared to that of direct bandgap semiconductors such as III–V compounds.

One embodiment of the present invention is also based on the recognition that the indirect bandgap structure of silicon can be converted into a direct bandgap structure by forming a silicon superlattice. This silicon superlattice includes alternating thin layers of silicon and another material. The strain between two different layers can change the indirect bandgap into a direct bandgap. This modification increases the probability of light absorption by carrier excitation. An optical modulator can use this silicon superlattice to modulate light with a greater modulation depth than an indirect bandgap silicon modulator. In addition, the silicon superlattice modulator can be integrated with other integrated circuits on the same silicon wafer.

Further, it is recognized that it is desirable to construct a silicon superlattice optical modulator based on a circuit element that is commonly used in integrated circuits formed on a silicon wafer. This integrates the fabrication of one embodiment of the presently described optical modulator with the standard fabrication processes for integrated circuits. Hence, processing steps unique for fabricating the optical modulator are reduced.

FIG. 1 shows one embodiment of an optical modulator 100 including a silicon superlattice optical modulator structure 120 formed in a silicon semiconductor substrate 110. The silicon substrate 110 has a front side 112 surface and a back side 114 surface. In one embodiment, circuitry of the integrated circuit die is located towards the front side 112 of the integrated circuit die. A vertical silicon superlattice structure 120 is formed in a region of the substrate 110 by alternating thin layers of silicon 122 and insulator layers 124 of a different material. In one embodiment, layers 122 and 124 are substantially parallel to the front side 112. Each silicon layer 122 is sandwiched between two insulator layers 124. In one embodiment, the outermost layers of the super lattice structure 120 are insulator layers 124. The transistor gate oxide layer 125 is positioned above the front side 112 surface and the silicon charge layer 122 immediately adjacent to the layer 125 is coplanar with the front side 112 surface.

In one embodiment, insulator layers 124 may be formed of a semiconductor compound having silicon such as silicon oxide (e.g., $SiO_2$), silicon nitride, or a silicon compound having both oxygen and nitrogen. The properties of layers 122 and 124 are configured so that the bandgap in the silicon layers 122 turns into a direct bandgap. For this, the superlattice in one embodiment is grown such as to cause stress in the semiconductor material. As can be appreciated to those having skill in the art, under strain, the Gamma-valley of the conduction band of silicon decreases its energy and the X-valley increases its energy. Therefore, for sufficiently thin layers of silicon, the bandgap turns to a direct one (in the Γ-valley). In an indirect-bandgap semiconductor, the interaction of light causes electron transitions between the Γ-valley of the valence band and the X-valley of the conduction band, which are phonon-assisted. In a direct bandgap semiconductor, the transitions are between the Gamma valleys, which do not require a phonon, and therefore are much more probable.

The silicon superlattice structure 120 is designed to fit into a common structure associated with standard circuit fabrication, such as for example a metal-oxide-semiconductor field-effect transistor (MOSFET). An n-channel MOSFET is shown in FIG. 1 as an example. If a p-channel MOSFET were to be used, the types of dopants in the device would be reversed. The silicon substrate 110 and the silicon layers 122 are p-doped. Two n-doped doped regions 130 and 132 are formed adjacent to the region where the superlattice structure 120 is located. The transistor gate oxide layer 125 is adjacent to the superlattice structure 120. An optically transparent gate electrode 140 is formed over the layer 125 to supply a desired electrical potential. In one embodiment, conducting materials such as doped polysilicon can be used to construct the gate electrode 140. For the n-MOSFET as shown, an n-doped polysilicon layer may be used. In one embodiment, the optical modulator 100 further includes a conducting reflective layer 150 formed over the transparent gate electrode 140 to supply the potential and to reflect optical beam 160. Conducting materials such as metals and silicon compound with a metal element (e.g., TiSi and CoSi) may be used. In another embodiment, optical beam may be reflected by another reflective layer in the integrated circuit die such as for example a conductor disposed behind gate 140 in an insulating or dielectric isolation layer of the integrated circuit die.

In one embodiment, the doped regions 130 and 132 are kept at a common electrical potential (e.g., grounded at approximately 0 V) that is different from the potential of the gate electrode 140. This configuration provides a desired potential difference on the superlattice structure 120 to create a charge and electric field distribution in layers 122. In comparison, a normal n-MOSFET uses the regions 130 and 132 as its source and drain. In another embodiment, only one of the doped regions 130 and 132 may be used along with the gate electrode 140 to apply a desired electrical potential difference on the superlattice structure 120.

Hence, the elements in the optical modulator 100 are fabricated in a similar way to a known MOSFET except for the silicon superlattice structure 120. The substrate 110 may be first prepared to form all of the alternating superlattice layers 122 and 124 of the superlattice structure 120 except the transistor gate oxide layer 125. This can be done by, e.g., molecular beam epitaxy or chemical vapor deposition or the like. Then standard MOS fabrication steps can be used to complete the top gate insulator layer 125 and the rest of the optical modulator 100. This aspect of the optical modulator 100 is useful for the integration of such optical modulators into integrated circuits, because it in general does not require any special processing steps unique to the optical modulator 100 beyond standard MOS processing steps. Therefore, other circuits such as for example driver circuitry for the optical modulator 100 can be fabricated with the MOS processing on the same substrate.

In operation, an input radiation or optical beam 160 is directed into the optical modulator 100 through the back side 114 surface. In order to transmit the optical beam 160 through the substrate 110, its frequency should be chosen such that it is smaller or approximately equal to the frequency of the transition across the bandgap (to avoid strong absorption due to intraband transitions) and, at the same time, not too small (to avoid absorption in intraband transitions which increases at smaller frequencies). This range is around the minimum of absorption in the semiconductor material.

In one embodiment, optical beam 160 propagates through the substrate 110, the silicon superlattice structure 120, and the transparent gate 140 to reach the reflector 150. The reflector 150 directs the beam back to the superlattice structure 120 for the second time before it exits through the back side 114 as a modulated output beam 162. In one embodiment, the potential difference applied to the superlattice structure 120 is modulated in response to a signal on the integrated circuit to change the charge carrier density and the electric field in the layers 122. This causes the absorption coefficient and the index of refraction of the layers 122 to change. Therefore, the input beam 160 is modulated in response to the signal on the integrated circuit die. Such modulation may be used to transfer electronic data onto the modulated optical beam 162.

A modulation depth of about 5% to 10% can be achieved with a few layers 122 and 124 in the superlattice 120. Higher modulation depth may be achieved by increasing the number of layers 122 and 124.

An alternative implementation of the above optical modulator 100 is to replace the transparent gate electrode 140 and the conducting reflector 150 by a single optically-reflective gate electrode.

Figure 2:
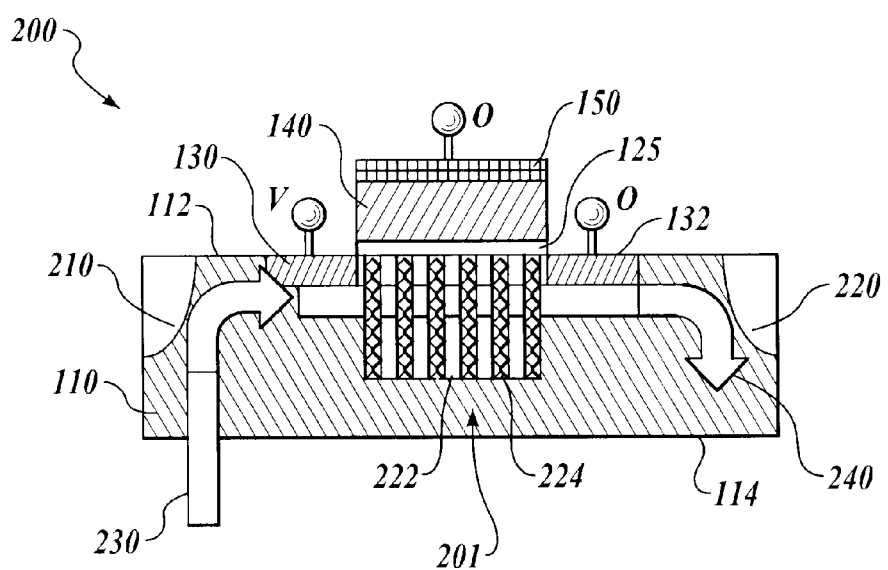
FIG. 2 illustrates another embodiment of a silicon superlattice optical modulator formed in a MOSFET structure on a silicon substrate, where the layers of the superlattice in the substrate stack in a horizontal direction. Light propagates horizontally that is parallel to the substrate surfaces.

FIG. 2 shows one alternative embodiment of an optical modulator 200 of a silicon superlattice optical modulator where the layers of a superlattice 201 are oriented substantially perpendicular to the substrate front side 112 and back side 114. In one embodiment, this horizontal superlattice 201 may be formed by, e.g., ion implantation or the like. In one embodiment, the potentials to the gate 140 and the doped region 132 are the same, e.g., at 0 V, and the potential at the doped region 130 is set to produce a desired voltage across the superlattice 201. In another embodiment, layers 125, 140, and 150 of the gate structure may be eliminated since the two doped regions 130 and 132 can provide the electrical voltage to the superlattice 201.

In one embodiment, two reflectors 210 and 220 may be formed in the substrate 110 on both sides of the superlattice 201 so that an input optical beam 230 entering through the back side 114 can be reflected by the reflector 210 to pass through superlattice 201 and can be further reflected by the reflector 220 toward the back side 114 to exit the modulator 200 as a modulated output beam 240. In one embodiment two reflectors 210 and 220 may be optical diffraction gratings formed in the substrate 110. Interfaces with a material having a refractive index less than silicon may also constructed to reflect the beam based on the total internal reflection, such as for example the surfaces of oxide isolating integrated circuits from one another. Such interfaces may be angled with respect to the front side 112 surface so that the a beam propagating within the substrate 110 either substantially parallel to or perpendicular to the substrate surface has an incident angle to the interfaces greater than the critical angle for the total internal reflection.

Similar to the vertical superlattice modulator 100 of FIG. 1, the number of superlattice layers in the horizontal superlattice modulator 200 can be increased to increase the modulation depth. In addition, two or more horizontal superlattice structures 201 may be formed within the same substrate in an optical path to increase the modulation depth.

Figure 3:
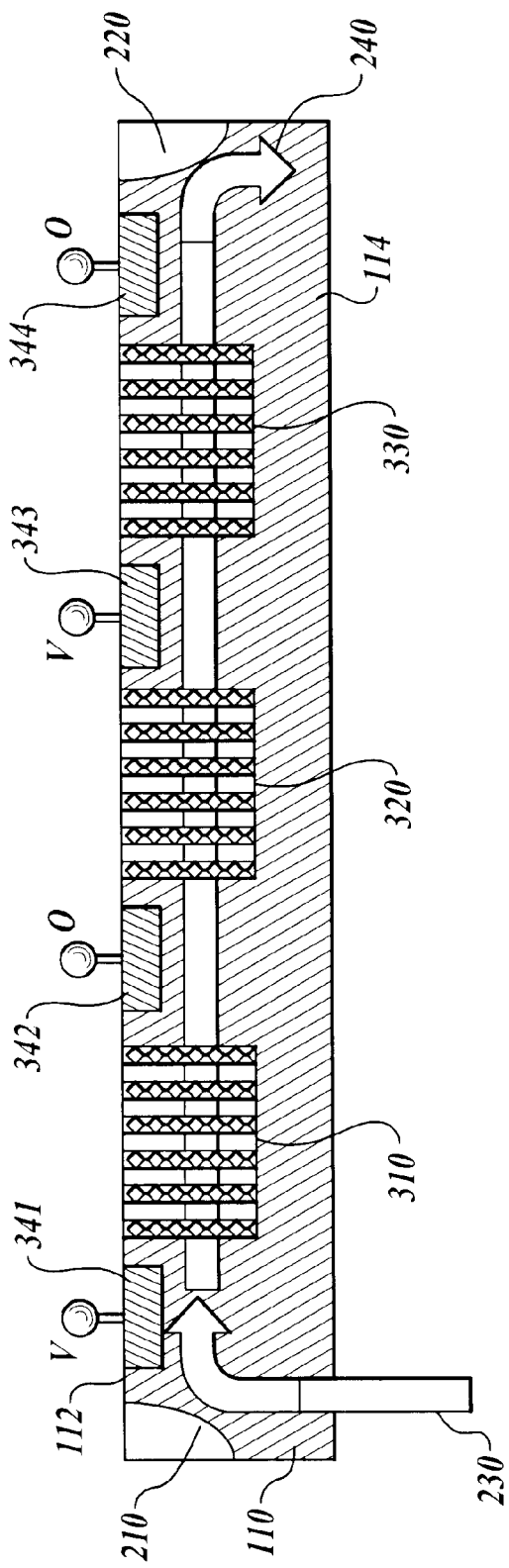
FIG. 3 shows several horizontal silicon superlattice modulators of FIG. 2 formed in the optical path of a beam within a substrate to increase the modulation depth.

FIG. 3 shows one embodiment of an integrated silicon optical modulator 300 having a linear array of a plurality of horizontal superlattice structures 310, 320, and 330 in the same substrate 110. Four doped regions 341, 342, 343, and 344 are formed to provide an electrical bias to the three superlattice structures 310, 320, and 330. The doped region 342 is a shared region located between the superlattice structures 310 and 320. Similarly, the doped regions 320 and 330 share the doped region 343. In one embodiment, doped regions 341 and 343 may be at a common potential while regions 342 and 344 may be set at another common potential. In one embodiment, two reflectors 210 and 220 are formed at either end of the superlattice linear array so that an input beam is directed to pass all three superlattice structures 310, 320, and 330.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A semiconductor device, comprising:
   a substrate of a semiconductor material having a front side surface and a back side surface opposing each other, said substrate configured to have a source region, a drain region, and a gate region proximate to said front side surface to provide a transistor, wherein said source and drain regions are to be maintained at different electrical potentials;
   a superlattice structure formed in said gate region to have alternating layers of charge layers formed of said semiconductor material and insulator layers that are substantially perpendicular to said first side surface; and
   a first reflector disposed is said substrate associated with said superlattice structure.

2. The device of claim 1, further comprising a second reflector is said substrate, said first and second reflectors disposed on either ends of said superlattice structure.

3. The device of claim 2, wherein at least one of said reflectors is an optical diffraction grating.

4. The device of claim 2, wherein at least one of said reflectors is configured to reflect radiation by total internal reflection.

5. The device of claim 1, further comprising:
   at least a second gate region in said substrate adjacent to one of said drain and source regions;
   a second superlattice structure formed in said second gate region to have alternating layers of charge layers formed of said semiconductor material and insulator layers formed of said another material that are substantially perpendicular to said first side surface, wherein said second superlattice structure is positioned in an optical path of said optical beam that passes through said first superlattice structure; and
   a doped region formed relative to said second superlattice structure at an electrical potential different from an electrical potential of said one of said drain and source regions to activate said second superlattice structure.

6. The device of claim 1, wherein said semiconductor material includes silicon.

7. The device of claim 1, wherein said insulator layers include silicon dioxide.

8. The device of claim 1, wherein said first reflector comprises oxide.

9. The device of claim 8, wherein said first reflector is angled with respect to said front side surface.

* * * * *